United States Patent [19]

Girovich

[11] Patent Number: 5,069,801
[45] Date of Patent: Dec. 3, 1991

[54] INDIRECT HEAT DRYING AND SIMULTANEOUS PELLETIZATION OF SLUDGE

[75] Inventor: Mark J. Girovich, Baltimore, Md.

[73] Assignee: Bio Gro Systems, Incorporated, Annapolis, Md.

[21] Appl. No.: 484,523

[22] Filed: Feb. 26, 1990

[51] Int. Cl.$^5$ ............................................. B01D 37/00
[52] U.S. Cl. ...................................... 210/770; 34/11; 34/12; 34/13; 34/237; 71/12; 71/13; 210/771
[58] Field of Search ...................... 210/710, 96.1, 776, 210/712, 713, 751, 769, 770, 771, 639; 71/9, 12, 25, 13, 64.03; 34/12, 13, 79, 60, 62, 73, 32, 194, 237, 238; 236/10, 15 BD, 34

[56] References Cited

U.S. PATENT DOCUMENTS

| | | | |
|---|---|---|---|
| 2,772,642 | 12/1956 | Lindl | 34/62 |
| 3,728,797 | 4/1973 | Worden, Sr. et al. | 34/73 |
| 3,963,471 | 6/1976 | Hampton | 210/710 |
| 4,098,006 | 7/1978 | Maffet | 34/12 |
| 4,761,893 | 8/1988 | Glorioso | 34/11 |
| 4,829,678 | 5/1989 | Glorioso | 34/11 |
| 4,852,269 | 8/1989 | Glorioso | 34/11 |
| 4,860,671 | 8/1989 | Glorioso | 110/236 |
| 4,974,335 | 12/1990 | Bege et al. | 34/60 |

Primary Examiner—Robert A. Dawson
Assistant Examiner—Sun Uk Kim
Attorney, Agent, or Firm—Fay, Sharpe, Beall, Fagan, Minnich & McKee

[57] ABSTRACT

Municipal sludge is dried in an indirect heating dryer to simultaneously dry and pelletize the sludge while preventing the escape of malodorous gases. The product exiting the dryer contains pelletized, undersized and oversized fractions. The dried product is classified to separate the undersized and oversized fractions from the pellets. The pellets are then cooled and stored for subsequent use as a fertilizer or fuel. The oversized fraction is crushed to obtain fines and mixed with the undersized fraction, which contains mostly fines. The fines are added to the liquid sludge before it is input to the dryer. The air that is used to cool the pellets, and that is used as sweep air in the dryer contains malodorous gases. In order to prevent the escape of these malodorous gases, the pellet cooling air and sweep air, which also includes the water vapor generated during the drying of the sludge, is deodorized by thermal treatment, preferably in a high temperature combustion zone.

16 Claims, 2 Drawing Sheets

INDIRECT HEAT DRYING AND SIMULTANEOUS PELLETIZATION OF SLUDGE

BACKGROUND OF THE INVENTION

1. Field of the Invention

The present invention relates to an apparatus and process for the indirect heat drying and simultaneous pelletization of liquid sludge, such as sludge obtained from a waste water treatment process. The sludge is mechanically dewatered, thermally dried, and processed to obtain sterile pellets, uniform in particle size and moisture content. Thereafter, the pellets are suitable for use as a fertilizer, an additive to a fertilizer, or as a fuel.

2. Description of Related Art

Municipal waste water treatment creates sewage sludge in large amounts. Raw sewage received in waste water treatment facilities is treated by various known methods which generate the sludge. Thereafter, a problem remains in how to treat and dispose of the sludge in an environmentally safe, energy efficient and economical way. Sludge is presently disposed of in many ways, such as by direct land application of the sludge, composting the sludge, land filling the sludge, ocean filling the sludge, and drying and incinerating the sludge.

Municipal sludge is mostly a liquid containing 2-6% total solids. It typically contains inorganic and organic matter, nutrients such as nitrogen, phosphorous and potassium and traces of various metals. It may also contain pathogens, and, in some instances, constituents such as heavy metals and hazardous organics, depending upon the source of the raw sewage that has been treated.

In the known methods of treating municipal sludge, the sludge is treated to increase its solid content. The sludge can be dewatered by gravity, by mechanically dewatering the sludge, and by thermal treatment of the sludge. The water content of sludge includes intracellular water, capillar water, colloidal water and free water. Free water can generally be separated from the sludge by gravity. The capillar and colloidal water can be removed from the sludge, usually after chemical conditioning, by mechanical means such as centrifuges, belt presses, vacuum filters and the like. Intracellular water, on the other hand, generally needs to be removed by breaking the cell structure down by thermal treatment. When liquid sludge is dewatered or thickened by gravity, the sludge product obtained is 2-6% total solids. The solids content is increased by mechanical dewatering of the sludge to 15-30% total solids. When the liquid sludge is thermally dried, a product of 85-95% total solids is obtained. Just as important, the volume of the sludge decreases as the sludge is processed to increase its solids content.

The type of dewatering process that is selected for a particular waste treatment plant is based upon several considerations. The thermal treatment of sludge has the advantage of the greatest reduction in sludge volume (up to 98%), and also destroys or inactivates pathogenic organisms, rendering the sludge sterile. On the other hand, the thermal treatment of sludge requires special drying equipment and an energy source for generating the heat needed in drying the sludge.

When liquid sludge is merely dewatered and land applied or ocean dumped, then there is a risk of contaminating the land or ocean with pathogens that have not been destroyed or inactivated during the treatment process. Further, if the sludge is not sufficiently dewatered, then an increased material handling problem arises in the transportation of the sludge by truck, barge, train or the like. Therefore, the thermal treatment of municipal sludge has environmental advantages as well as material handling advantages over the disposal of municipal sludge that is merely dewatered or land applied in the liquid sludge state.

Two types of sludge thermal drying are known in the treatment of municipal sludge. In the first type of system, known as direct drying, hot gas is brought into direct contact and mixed with the sludge in a chamber to vaporize the water in the sludge directly. The problem with direct drying of liquid sludge is that a large volume of malodorous gas is generated in the drying process that subsequently needs to be treated in order to maintain an odorless treatment process.

Another known type of thermal treatment of municipal sludge uses an indirect sludge drying process wherein the sludge contacts a heated surface to vaporize the water contained therein. One known type of indirect dryer is illustrated schematically in FIG. 2. The sludge is dried by spreading it across metal surfaces heated by steam or thermal oil so that direct contact between the heating medium and the sludge is prevented. Thus, the heating medium remains clean and uncontaminated, and the water vapors and volatile matter that are extracted during the drying are of relatively low volume. The organic matter and nutrients remain in the dried sludge product that exits the dryer. Further, the sludge is exposed to a temperature of above 100° C. for a sufficient time to inactivate or destroy any living organisms contained therein such as viruses, pathogens, etc. This type of indirect heat dryer is used in a process, for example, wherein the dried sludge product is fed to a fluidized bed furnace for incineration of the sludge product. Incineration of sludge on a continuous basis, however, has obvious environmental drawbacks, and is therefore undesirable in general.

SUMMARY OF THE INVENTION

An object of the present invention is to overcome the deficiencies of the known municipal sludge treatment systems by using a dryer for municipal sludge that has been dewatered mechanically to dry the sludge by indirect drying and simultaneously pelletizing the dried product inside the dryer so that it is acceptable for use as a fertilizer in pellet form. In this way, the sludge is converted into a marketable pelletized product that can be land applied as a fertilizer. The pellets do not contain any living organisms, viruses or pathogens so that the risk of contaminating the land, which is present in the direct application of municipal sludge that has not been heat treated, is avoided. Further, as a result of simultaneously pelletizing the dried product to form pellets of a size that can be handled like existing fertilizer pellets, no additional pellet forming apparatus is required that would increase the cost of the system. Further, by producing a marketable pellet fertilizer product, the costs of operating the sludge treatment system are offset.

It is an object of the invention to provide an automated non-polluting, odorless process for treating dewatered sludge by an indirect heat drying method with simultaneous pelletization of the sludge in a multi-stage dryer. The dried product exiting the dryer contains several fractions, including pellets of a desired size, referred to as on specification (on-spec) pellets, oversized pieces of dried product that are larger than the on-spec pellets, and undersized pieces of dried product or fines that are smaller than the on-spec pellets, and which include dust. Therefore, the dried product exiting the dryer is classified to separate the pellets from the over and undersized fractions.

It is yet another object of the invention to operate a vertical multi-stage dryer, such as the one shown in FIG. 2, by recycling the fines obtained in the post-drying classification or screening step to the inlet of the dryer for mixing them with the dewatered sludge. Further, in order to ensure an adequate supply of recycled fines, the oversized dried product is preferably crumbled to obtain additional fines that are subsequently mixed with the dewatered sludge before it is fed into the dryer.

The dryer feed is preferably kept at a moisture content of between 60 to 70% solids so that a difficult to handle, glue-like sludge phase inside the dryer is avoided. By the process of indirect heat drying of the dewatered sludge, the dried fines are mixed with the dewatered sludge to provide central dry nuclei that are coated by the dewatered sludge and dried to build up the nuclei layer by layer to form the pellets of a desired size, preferably 2–4 millimeters. As a result of the build up of the central dry nuclei obtained from the post-drying screening and crumbling processes, pellets are built up layer by layer, and are therefore dried from the inside out. It is further preferable that a supply of dried fines are maintained for start-up of the process after the indirect heat dryer has been shut down for a period of time.

It is an object of the invention to achieve an odorless process for the indirect drying of dewatered sludge and simultaneous pelletization thereof that includes cooling the on-specification pellets with air that is subsequently thermally treated to destroy any odor causing substances contained therein. It is further preferable to separate the dust from the air used in cooling the on-spec pellets by a fabric filter so that the dust can be added to the fines that are recycled and mixed with the dewatered sludge before being input to the dryer.

It is an object of the invention to obtain the pellet cooler air preferably by extracting it from a silo used in storing the dewatered sludge before it is input to the dryer to maintain a negative pressure in the silo that prevents leakage of malodorous gases from the silo.

It is an object of the invention to provide an odorless process wherein the sweep air required to facilitate water vapor transport through the dryer is taken from the pellet cooling air stream after it has been used to cool the pellets since such air is otherwise destined for thermal post treatment and deodorization in a high temperature zone.

It is an object of the invention to provide an odorless process wherein the dryer exhaust containing water vapor and sweep air contaminated with malodorous constituents, such as methane, high molecular weight organics and ammonia, are ducted from the dryer to an indirect vapor condenser where the water vapor is condensed and the latent energy of the water vapor is recovered and used to heat the liquid sludge, which is the coolant for the water vapor condenser. Therefore a small amount of noncondensable gas consisting of mainly sweep air with malodorous constituents contained therein is ducted to a boiler for thermal treatment and deodorization in a high temperature zone.

DESCRIPTION OF THE PREFERRED EMBODIMENTS

Figure 1:
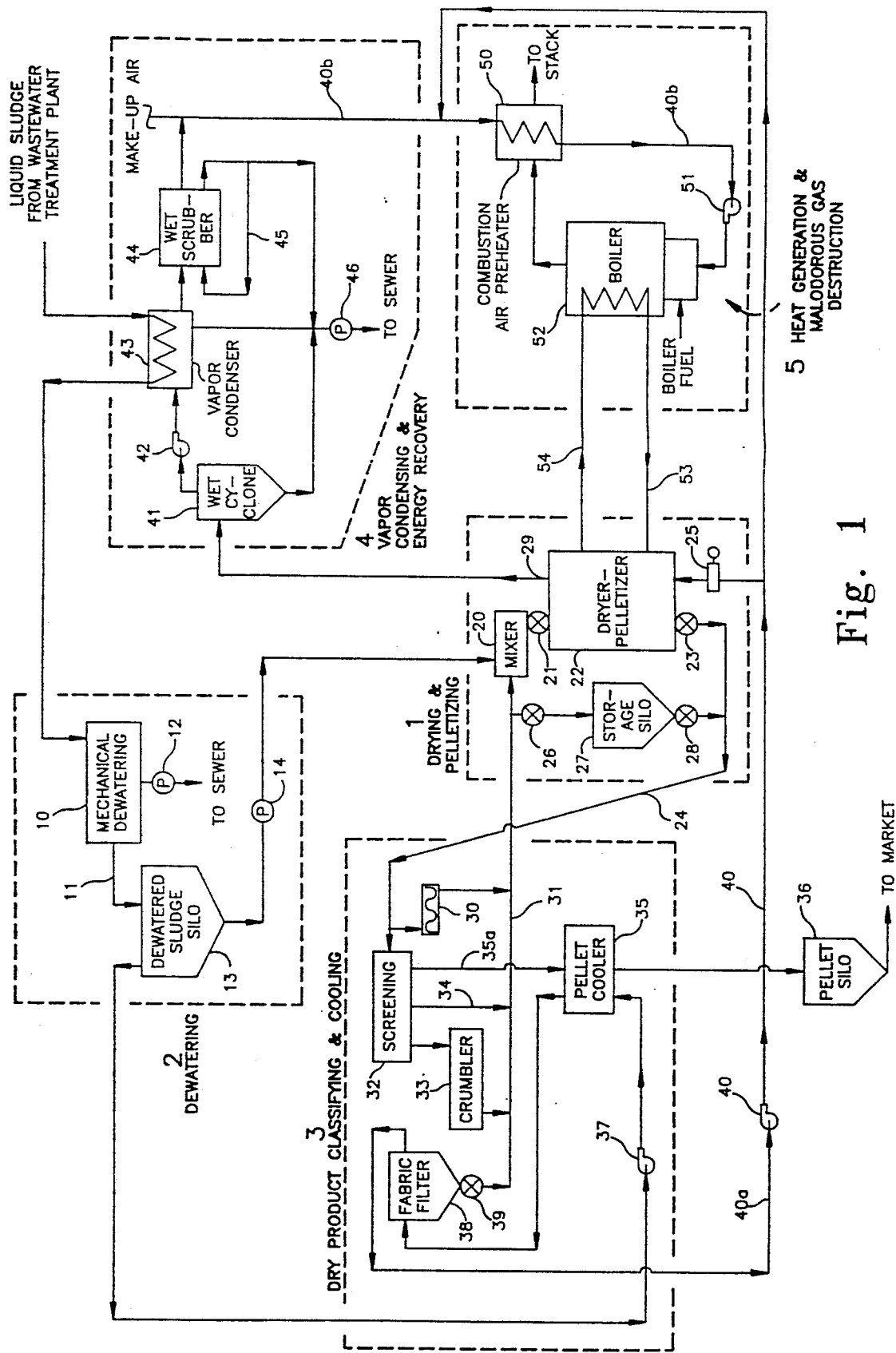
FIG. 1 is a flow chart representing various parts of the municipal sludge treating process of the invention.

The apparatus and process for indirect heat drying and simultaneous pelletization of liquid waste sludge is shown in FIG. 1. The system is fully integrated to provide an odorless, highly energy efficient process for treating liquid sludge wherein the escape of malodorous gases is minimized, and sterile dry pellets are produced as a fertilizer or fuel product, for example. As shown in FIG. 1, the system includes a drying and pelletizing section 1, a dewatering section 2, a dry product classifying and cooling section 3, a vapor condensing and energy recovery section 4, and a heat generation and malodorous gas destruction section 5. Each of these sections is shown in dashed lines.

Referring to FIG. 1, the liquid sludge from a waste water treatment plant is first preheated through a vapor condenser 43, discussed in greater detail hereinafter with respect to the vapor condensing and energy recovery section 4, and transported to a mechanical dewatering apparatus 10. The mechanical dewatering apparatus 10 can be a conventional dewatering apparatus such as a vacuum filter, belt press, or centrifuge. Preferably, the liquid sludge is chemically treated with polymers, for example, before being mechanically dewatered in order to ensure the separation of the capillar and colloidal water from the liquid sludge in addition to the free water during the mechanical dewatering step. The water that is removed in the mechanical dewatering apparatus 10 is pumped to a sewer or other outlet of the system by pump 12. The dewatered sludge, on the other hand is transported to a dewatered sludge silo 13 through conveyor 11.

The drying and pelletizing section receives the dewatered sludge stored in silo 13 in a mixer 20 as it is pumped from the silo by a pump 14. In the mixer 20, the dewatered sludge is mixed with fines obtained from the dry product classifying and cooling section 3, and the mixture is input to dryer 22 through air lock valve 21. Preferably, the moisture content of the mixture entering the dryer is between 60 and 70% solids in order to avoid a difficult to handle, glue-like sludge phase inside the dryer.

The fines that are mixed with the dewatered sludge play an important role in the simultaneous drying and pelletizing process. Each particle of the fines represents a central dry nucleus that is built up layer by layer with the dewatered sludge and dried to form the pellets and other dried material of various sizes. As the mixture of sludge and fines moves through the dryer, the layering process is repeated over and over until the product exits the dryer. Therefore, the dried product exiting the dryer will be in various shapes and sizes, and will include the pellets that are the desired end product of the process. Since each of the pellets is formed from a dry core, the resultant pellets have a structural stability that withstands subsequent material handling steps without crumbling.

Figure 2:
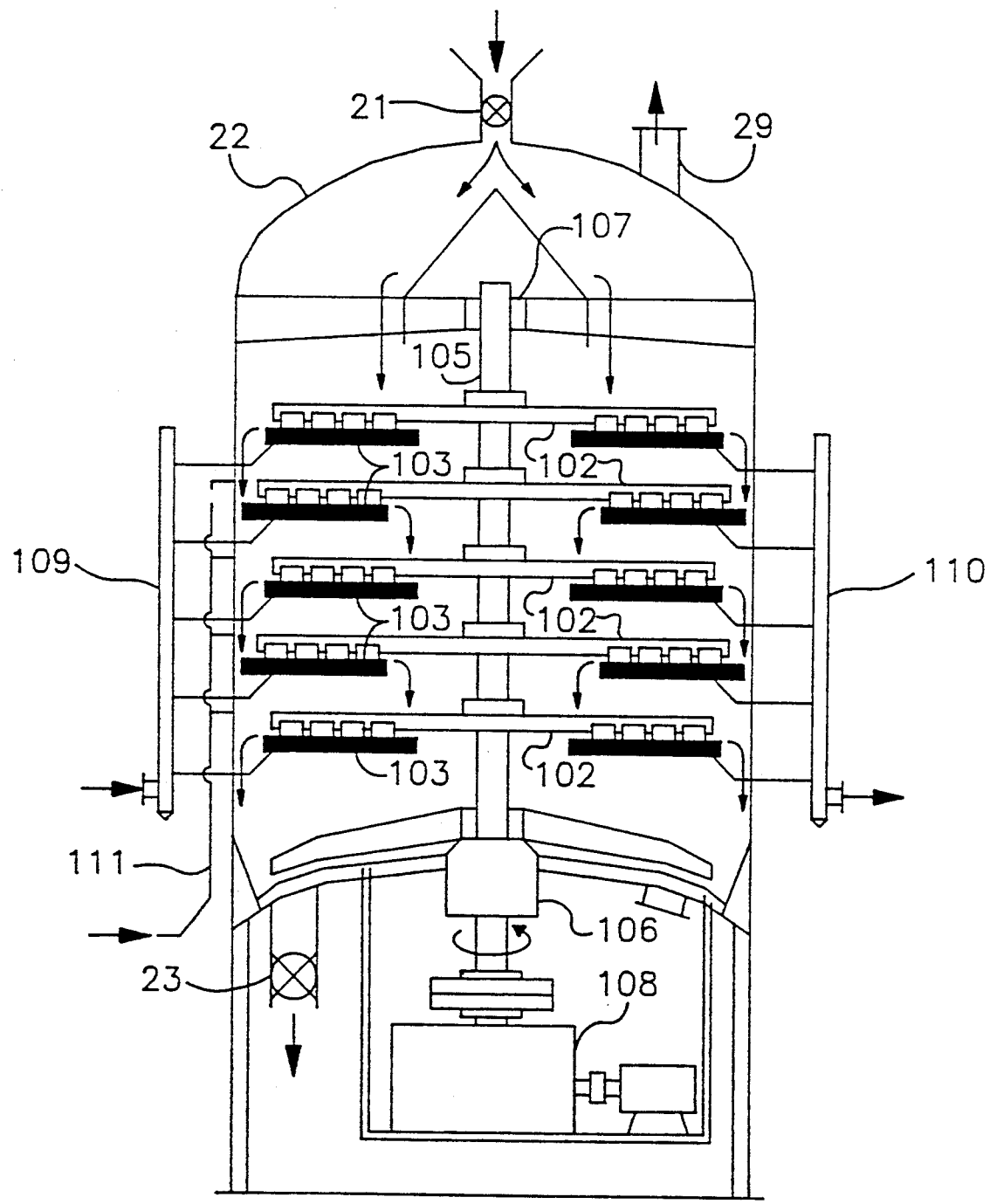
FIG. 2 is a schematic cross-sectional representation of an indirect heat dryer used in the process of the invention.

Referring to FIG. 2, dryer 22 is preferably a vertical multi-stage dryer that simultaneously dries and pelletizes the sludge introduced through air lock valve 21. Within the dryer, the sludge is moved by the rotating arms 102 which have adjustable scrapers for spreading and scraping the sludge across stationary hollow, heated trays 103. The arms 102 are connected to a central shaft 105 supported by bearings 106 and 107 for rotation by a motor and gear assembly 108. As the arms turn, the sludge is moved from one tray to another causing the nuclei of the pellets obtained from the dried fines to be coated layer by layer with the dewatered sludge to produce a plurality of dried pellets, fines and oversized dried product that exits from the dryer through air lock valve 23.

The trays 103 are heated by thermal oil or steam that enters the dryer through a manifold 109 and exits the dryer through a manifold 110. The thermal oil or steam is heated in recirculation by a boiler 52 (FIG. 1) or other suitable heat generating device. Sweep air is provided to the interior of the dryer through a sweep inlet air control damper 25 (FIG. 1) that is introduced into the dryer through an inlet manifold 111. The sweep air assists in moving the water vapor through the dryer. As shown in FIG. 1, a fan 42 is provided to exhaust the sweep air and water vapor from the dryer through valve 29 to maintain a negative pressure within the dryer for preventing malodorous gases from escaping from the dryer. Also, the use of air lock valves 21 and 23 at the inlet and outlet of the dryer, respectively, prevents the accidental leakage of malodorous gases.

In an indirect heating dryer, such as the multi-stage vertical dryer 22, the heating medium heats the sludge by conduction and radiation, rather than by convection. The heated surfaces of the dryer contact the sludge so that the sludge is indirectly heated with respect to the heating medium. In this way, the problems associated with direct convection heating are overcome. In direct convection heating, a large volume of drying air needs to be brought into contact with the sludge in order to dry it. As a result, a significant post treatment process is required to treat the drying gas to prevent the escape of odors from the drying operation. According to the present invention, however, a significantly smaller volume of air is used, which functions as sweep air that is moved through the dryer to remove the water vapor, volatile organic compounds and malodorous constituents generated during the drying process. The sweep air that is used in the drying process of the invention also needs to be treated to prevent odors from escaping, but the amount of sweep air that needs to be treated is significantly less than the amount of air that needs to be treated in a direct heat drying operation. Further, by spreading the sludge out across the heated trays 103 in a thin layer during the drying, the heating of the sludge to a temperature of greater than 100° C. can be ensured. This sterilizes the sludge product to destroy and inactivate all living organisms such as viruses, pathogens, etc. Accordingly, the dewatered sludge is dried, simultaneously pelletized and rendered sterile for safe subsequent use as a fertilizer, fuel or the like in a single operation.

A certain amount of the fine dried product is stored in a storage silo 27 for subsequent use in providing a supply of dried product to mixer 20 in the event of a start-up operation of the dryer 22. The storage of dried fines in silo 27 is controlled through valves 26 and 28 so that a predetermined amount of stored fines is maintained at all times. The fines are required for mixing with the dewatered sludge prior to being input to dryer 22 in order to obtain an adequate volume of pellets in the dried product.

As explained, during normal operations of the drying and pelletizing section, the dried product that exits the dryer contains oversized, standard and fine fractions mixed together. These fractions constitute the dried sludge product which is 90 to 95% solids. If the dryer 22 has just been started, then a certain amount of time is required before the pellets are developed of the desired size. During this time period, preferably all of the dried product is recycled to the mixer 20 through a variable speed screw conveyor 30. Once the dryer has been operating for a predetermined amount of time, then the desired pelletizing of the dried product takes place and the dried product can be classified and cooled in section 3.

During normal operating conditions, all of the dried product exiting from dryer 22 is conveyed through conveyor 24 to the dry product classifying and cooling section. First, the dried product is classified by a vibrating screen 32, for example, and separated into the oversized, on-spec, and fine fractions. Since it is necessary to supply an adequate quantity of dried fines for recycling to the mixer 20, the oversized fraction is preferably crumbled or crushed by a crumbler 33, and transported by conveyor 31 back to mixer 20. Similarly, the fines that are able to pass through the mechanical screening apparatus 32 are conveyed to conveyor 31 by a conveyor or chute 34. In this way, an adequate supply of dried fines are available for mixing in mixer 20 with the dewatered sludge before the input to dryer 22.

According to the process of the present invention, the dryer 22 is operated in a predetermined way to obtain a dried product having a maximum amount of pellets that are on-spec. These pellets are separated from the oversized and fine fractions by the screening apparatus 32 and transferred to the pellet cooler 35 through a chute or conveyor 35a. As part of the object of the invention to contain the escape of malodorous gases, the pellets contained in pellet cooler 35 are cooled by air obtained from the dewatered sludge silo 13. In this way, a negative pressure is maintained within dewatered sludge silo 13 by a fan 37 so that the malodorous gases do not escape from the dewatered sludge silo. Once the pellets are cooled in pellet cooler 35, they are transferred to pellet silo 36 for subsequent distribution as a marketable fertilizer or fuel product. The air used in cooling the pellets in pellet cooler 35 contains malodorous gases and dust. It is conveyed to a fabric filter 38 for removing the dust. Thereafter it is conveyed by fan 40 through a duct 40a for use as sweep air in the drying and pelletizing section 1, and for destruction in the heat generation and malodorous gas destruction section 5, as explained hereinafter. The dust removed from the pellet cooler air by fabric filter 38 is transferred to conveyor 31 through air lock valve 39 for preventing malodorous gases from escaping to the environment and causing an odor problem.

Recognizing that the dryer does not require fresh sweep air and that the pellet cooler air present in duct 40a contains malodorous gases that otherwise need to be destroyed within the system, the pellet cooler air is utilized as the sweep air in dryer 22. The amount of sweep air that is supplied to dryer 22 is controlled by sweep inlet air control damper 25, which is shown connected to pellet cooler air duct 40a. As the amount of sweep air needed in the dryer 22 is less than the total amount of pellet cooler air conveyed through duct 40a, the remainder of the pellet cooler air is conveyed to the heat generation and malodorous gas destruction section 5 for deodorization. As shown in FIG. 1, the duct 40a is connected to a duct 40b that supplies the boiler 52 with combustion air. Boiler 52 preferably has an open flame combustion zone. The combustion air is supplied through a fan 51. The combustion air is preheated by an air preheater 50 to prevent condensation of the water vapor contained in the pellet cooler air in the air duct so that corrosion due to condensation is minimized.

At the other end of the dryer 22, the sweep air along with the water vapor generated during the drying exits through a discharge outlet 29, and is removed along with volatile organics and malodorous constituents by fan 42. This maintains a slightly negative pressure within the dryer that prevents malodorous gases from leaking into the environment and causing an odor problem. The water vapor and sweep air are extracted from the dryer 22 at a temperature of 230°-250° F. and input to a wet cyclone 41 for removing coarse particulate matter that may be contained within the dryer exhaust, which is a mixture of 5 to 10 percent of sweep air and 90-95 percent of water vapor.

To increase the energy efficiency of the liquid sludge treatment apparatus, the dryer exhaust is input to an indirect vapor condenser 43 that condenses the water vapor out of the dryer exhaust and simultaneously preheats the liquid sludge from the waste water treatment plant prior to its delivery to the mechanical dewatering apparatus 10. In other words, the liquid sludge from the waste water treatment plant is used as a coolant for the vapor condenser 43, resulting in the latent heat of vaporization being recovered from the dryer exhaust and being transferred to the liquid sludge. As an added cost savings, once the liquid sludge is preheated, a smaller amount of chemical conditioners can be used in pretreating the liquid sludge before it is input to the mechanical dewatering apparatus 10. The water condensate that is removed from the vapor condenser 43 is pumped to a sewer by a pump 46.

The non-condensable malodorous gas contained within the dryer exhaust is transferred from the vapor condenser 43 to a wet scrubber 44 wherein the remaining fine particulate matter is removed and the gas is cooled by scrubber water recirculating in line 45. This cooling contributes to the condensation of volatile metal vapors such as mercury and prevents hazardous metal emission into the atmosphere in accordance with another object of the present invention to provide a non-polluting liquid sludge waste water treatment process.

After passing through the wet scrubber 44, the non-condensable malodorous gas is mixed with the combustion air for boiler 52 in duct 40b, and treated in the same manner as the pellet cooler air. Preferably, boiler 52 is heated by gas, oil, or another fuel with an open combustion zone. In this way, all processed malodorous gaseous effluents are thermally treated in the high temperature zone of the combustion zone (preferably at least 1900° F.) of boiler 52 with a sufficient time of no less than 1 second in order to destroy potentially hazardous organics and to deodorize the gaseous discharge. Accordingly, another object of the invention is achieved wherein a minimum amount of malodorous gases escape the system so that the environment surrounding the sludge treatment apparatus is odor free. Further, since the boiler 52 requires combustion air, the use of the non-condensable sweep air and pellet cooler air for the combustion air is convenient. Of course, additional combustion air is required, and the addition of fresh air from outside of the system can optionally be supplied.

Although the present invention has been described with respect to an overall integrated system in accordance with achieving the objects of the invention of providing a nonpolluting, fully automated, and odorless liquid sludge treatment system, alternative apparatus than that disclosed can be substituted in order to achieve the same objectives, without departing from the spirit and scope of the invention.

I claim:

1. A process for treating liquid sludge obtained from a waste water treatment plant, comprising:
producing an organic fertilizer product by following the steps of: dewatering the liquid sludge to obtain a dewatered sludge product, mixing dry fines as nuclei for pellets into the dewatered sludge to produce a mixture, inputting the mixture into a dryer performing indirect heat drying and simultaneous pelletizing of the mixture by coating the nuclei with the dewatered sludge during said mixing and drying to build up the pellets layer by layer to a predetermined size, supplying sweep-air to the dryer for removing an air and water vapor mixture produced by the drying, extracting a dried product and the air and water vapor mixture from the dryer separately from one another, classifying the dried product extracted from the dryer into oversized, on-spec and fines fractions, wherein the oversized and fines fractions are greater than and smaller than the on-spec fractions respectively, crumbling the oversized fraction to a smaller predetermined size, recycling and using the fines and crumbled fractions as said dry fines in said mixing step, and maintaining a negative pressure in the dryer for preventing the escape of malodorous gases from the dryer.

2. A process according to claim 1, further comprising the steps of: storing the dewatered sludge in a silo prior to the drying and pelletizing step, obtaining the pellet cooling air from the silo, and controlling the amount of fresh air entering the silo in order to maintain a negative air pressure within the silo to prevent the escape of malodorous gases contained therein.

3. A process according to claim 2, wherein said sweep air is supplied to the dryer through a damper controller, and said sweep air is obtained from a supply of the pellet cooling air after the pellet cooling air has been used to cool the pellets.

4. A process according to claim 1, wherein the pellet cooling air and sweep air are conveyed to an open flame combustion zone for destroying the malodorous gas elements contained therein.

5. A process according to claim 4, including preheating the air supplied to said combustion zone to prevent condensation of the air and subsequent corrosion and to save energy.

6. A process according to claim 1, including recovering energy from the water vapors extracted from the dryer and preheating the liquid sludge obtained from the waste water treatment plant prior to the dewatering with the energy thus recovered.

7. A process according to claim 6, wherein the energy is recovered by condensing the water vapors of the dryer exhaust in a vapor condenser apparatus, and the liquid sludge obtained from the waste water treatment plant is used as the coolant in the vapor condenser apparatus.

8. A process according to claim 1, including heating said dryer with a recirculating heating medium that is heated by a furnace having an open flame combustion zone, wherein the pellet cooling air and sweep air extracted from the dryer are supplied to the combustion zone for destroying their malodorous content.

9. A process according to claim 1, including storing the dry fines after the classifying in a separate silo and using the dry fines in the mixing step during start-up of the dryer.

10. A process according to claim 1, further including recycling all of the dried product exiting the dryer to the mixer at the inlet of the dryer during start-up of the dryer until the dried product exiting the dryer contains a predetermined quantity of the on-spec fraction.

11. A process according to claim 1, wherein said mixture is heated in said dryer to a predetermined temperature for a predetermined amount of time to sterilize the mixture.

12. A process according to claim 1, including heating said dryer with a recirculating heating medium that is heated by a furnace having an open flame combustion zone, condensing the air and water vapor mixture extracted from the dryer to obtain liquid condensate and non-condensable air, wet-scrubbing the non-condensable air to remove airborne particulate matter, and conveying the web-scrubbed non-condensable air to the combustion zone for thermally destroying the malodorous gas elements contained therein.

13. A process according to claim 12, further including cooling the on-spec pellets with pellet cooling air prior to storing the pellets, using a portion of the pellet cooling air as the sweep-apr supplied to the dryer, and conveying the remainder of the pellet cooling air to the combustion zone for thermally destroying the malodorous gas elements contained therein.

14. A process for treating liquid sludge obtained from a waste water treatment plant, comprising the steps of:
dewatering the liquid sludge to obtain a dewatered sludge product, mixing a pellet forming nuclei substance into the dewatered sludge to produce a mixture, inputting the mixture into a dryer that performs indirect heat drying and simultaneous pelletizing of the mixture by coating the nuclei with the dewatered sludge during mixing and drying to build up the pellets layer by layer to a predetermined size;
supplying sweep-air to the dryer for removing an air and water vapor mixture from the dryer;
extracting a dried product and the air and water vapor mixture from the dryer separately from one another;
classifying the product exiting the dryer into on-spec and fines fractions, wherein the fines fraction is smaller in size than the on-spec fraction; and
recycling the fines fraction for use in said mixing step, wherein said pellet forming nuclei substance consists essentially of the fines fraction.

15. A process according to claim 14, including heating said dryer with a recirculating heating medium that is heated by a furnace having an open flame combustion zone, condensing the air and water vapor mixture extracted from the dryer to obtain liquid condensate and non-condensable air, wet-scrubbing the non-condensable air to remove airborne particulate matter, and feeding the web-scrubbed non-condensable air to the combustion zone for thermally destroying the malodorous gas elements contained therein.

16. A process according to claim 15, further including cooling the on-spec fraction with cooling air prior to storing, using a portion of the cooling air as the sweep-air supplied to the dryer, and conveying the remainder of the cooling air to the combustion zone for thermally destroying the malodorous gas elements contained therein.

* * * * *